United States Patent
Schuller et al.

[11] Patent Number: 6,079,961
[45] Date of Patent: Jun. 27, 2000

[54] PISTON PUMP FOR A VEHICLE BRAKE SYSTEM HAVING A PLASTIC PISTON WITH A WEAR RESISTANT CAM-STRIKING FACE

[75] Inventors: Wolfgang Schuller, Sachsenheim; Ursula Eckstein, Schwieberdingen, both of Germany

[73] Assignee: Robert Bosch GmbH, Stuttgart, Germany

[21] Appl. No.: 09/269,664

[22] PCT Filed: May 15, 1998

[86] PCT No.: PCT/DE98/01355

§ 371 Date: May 28, 1999

§ 102(e) Date: May 28, 1999

[87] PCT Pub. No.: WO99/06696

PCT Pub. Date: Feb. 11, 1999

[30] Foreign Application Priority Data

Jul. 30, 1997 [DE] Germany .............................. 197 32 811
Jan. 29, 1998 [DE] Germany .............................. 198 03 333

[51] Int. Cl.$^7$ ...................................................... F04B 1/04
[52] U.S. Cl. .............................. 417/549; 417/470; 92/129; 92/248
[58] Field of Search ...................................... 417/549, 470; 92/129, 248

[56] References Cited

U.S. PATENT DOCUMENTS

| | | | |
|---|---|---|---|
| 3,041,115 | 6/1962 | Boyer | 92/248 |
| 3,125,004 | 3/1964 | White | 92/129 |
| 3,139,010 | 6/1964 | Herbst | 92/129 |
| 3,874,275 | 4/1975 | Cunningham et al. | 92/248 |
| 4,519,299 | 5/1985 | Moloney | 92/129 |
| 4,528,895 | 7/1985 | Nakamura | 92/129 |
| 4,535,683 | 8/1985 | Dworak et al. | 92/224 |
| 4,548,126 | 10/1985 | Donomoto et al. | 92/213 |
| 4,741,254 | 5/1988 | Taylor | 92/248 |
| 5,567,135 | 10/1996 | Mueller et al. | 417/549 |

*Primary Examiner*—Charles G. Freay
*Assistant Examiner*—Robert Z. Evora
*Attorney, Agent, or Firm*—Ronald E. Greigg; Edwin E. Greigg

[57] ABSTRACT

A piston pump for a slip-controlled motor vehicle brake system, with a piston which, by means of a piston restoring spring, is pressed with an end face that constitutes a strike face against a circumference of a cam. The cam is driven to rotate, wherein the cam is used to drive the piston in a reciprocating stroke motion. In order to be able to inexpensively manufacture the piston as an injection molded part made of plastic, the piston is provided with a cam strike piece made of wear resistant material on the strike face which is in contact with the cam.

20 Claims, 1 Drawing Sheet

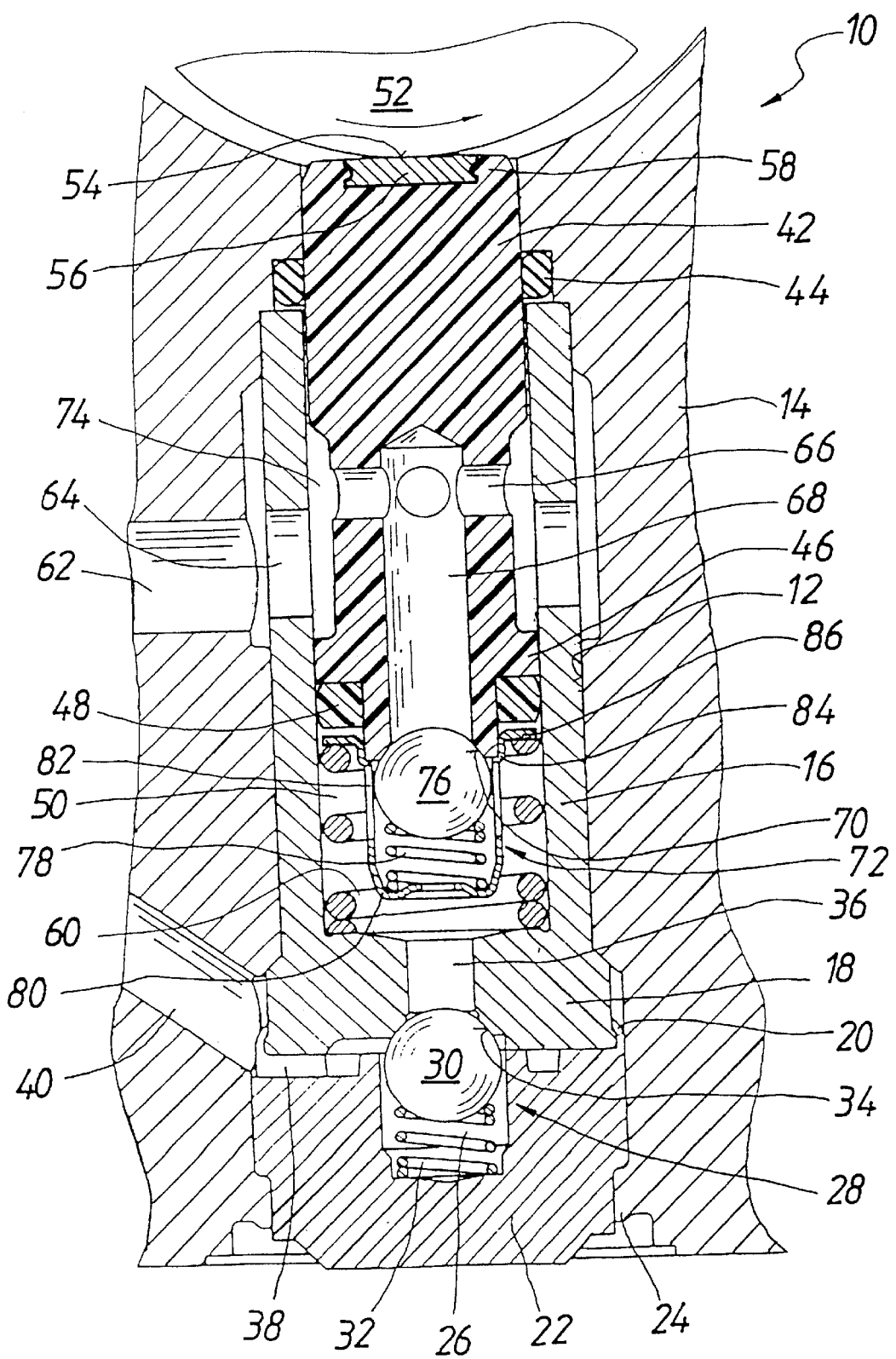

6,079,961

PISTON PUMP FOR A VEHICLE BRAKE SYSTEM HAVING A PLASTIC PISTON WITH A WEAR RESISTANT CAM-STRIKING FACE

CROSS-REFERENCE TO RELATED APPLICATIONS

This application is a 371 of PCT/DE98/01355 filed on May 15, 1998.

BACKGROUND OF THE INVENTION

The invention relates to a piston pump for a brake of a vehicle.

A piston pump of this kind for a hydraulic, slip-controlled vehicle brake system has been disclosed by DE 41 07 979 A1. The known piston pump has a pump housing with a cylinder bore in which a piston is contained so that the piston can move axially. A cam element that can be driven to rotate is provided for driving the piston into a reciprocating stroke motion in the axial direction; this cam element is disposed against an end face of the piston and the piston includes an end face that rests against a circumference which constitutes a strike surface. The piston of the known piston pump is a costly, multiple-step work piece that is manufactured in a cutting fashion by means of turning and boring. A circumference surface of the piston must be ground since it constitutes a bearing surface of the piston.

ADVANTAGES OF THE INVENTION

The piston pump according to the invention, has a piston made of plastic, which is manufactured, for example, by means of injection molding. In order for the end face of the piston, which constitutes the strike surface and which rests against the cam element, to be able to durably withstand the stresses occurring between the cam element and the strike surface predominantly due to friction, the piston has a cam strike piece made of wear resistant material on its strike surface. The cam strike piece is for example disk shaped, it is preferably inserted into an injection molding tool before the piston is injection molded, and the plastic of the piston is injection molded around the cam strike piece, wherein the strike face provided for contacting the cam element is not covered with plastic. The cam strike piece can, for example, be comprised of a metal such as hardened steel, or of ceramic, for example sintered ceramic.

Firstly, the piston pump according to the invention has an advantage that its piston can be simply, rapidly, and inexpensively manufactured in one work cycle by means of injection molding. A finishing, for example by means of grinding the piston circumference or shaping a valve seat disposed in the piston, can be eliminated. Fluid conduits possibly required in the piston for the fluid inlet into the piston pump or for the fluid outlet from the piston pump are produced with forming cores inserted into the injection molding tool so that finishing is not required for the inlet or outlet cores.

Other advantages of the invention are positive sliding properties of the piston in the pump housing due to the fact that the piston is made of plastic. In order to improve the sliding properties and to reduce wear, the plastic of the piston can have TEFLON components added to it. If a valve that controls the fluid inlet or the fluid outlet is attached to the piston, whose valve seat is embodied on the piston, the elasticity behavior of the piston made of plastic improves the closing behavior and tightness of the valve, particularly with increasing pressure.

The piston can also be used to produce a seal between the piston and the pump housing. This has the advantage that a sealing ring can be omitted.

Another advantage of the invention is that without additional expense, a stepped piston can be produced in which one end of the piston has a greater diameter than the other end of the piston.

Advantageous embodiments and improvements of the invention disclosed are a subject of the invention disclosed hereinafter.

With an embodiment of the invention, the cam strike piece has positive engagement elements on an outside which produce a positive engagement with the piston in order to improve the securing of the cam strike piece in the piston. Positive engagement elements of this kind can be continuous or interrupted ribs, grooves, or the like.

The piston pump according to the invention is provided in particular as a pump in a brake system of a vehicle and is used to control the pressure in wheel brake cylinders. The abbreviations ABS, ASR, FDR, or EHB are used for such brake systems, depending on the type of brake system. In the brake system, the pump serves for instance to return brake fluid from a wheel brake cylinder or a plurality of wheel brake cylinders to a master cylinder (ABS) and/or to supply brake fluid out of a storage tank into a wheel brake cylinder or a plurality of wheel brake cylinders (ASR, FDR, or EHB). The pump is required, for example, in a brake system with wheel slip control (ABS or ASR) and/or a brake system serving as a steering aid (FDR) and/or an electrohydraulic brake system (EHB). With wheel slip control (ABS or ASR), for example, a locking of the wheels of the vehicle during a braking event when there is strong pressure on the brake pedal (ABS) and/or a spinning of the driven wheels of the vehicle when there is strong pressure on the gas pedal (ASR) can be prevented. In a brake system that serves as a steering aid (FDR), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB) in which the pump supplies the brake fluid into the wheel brake cylinder or cylinders if an electrical brake pedal sensor detects an actuation of the brake pedal or in which the pump is used to fill a reservoir of the brake system.

BRIEF DESCRIPTION OF THE DRAWINGS

The invention will be explained in more detail below in conjunction with a preferably selected exemplary embodiment shown in the drawing.

The sole FIGURE shows an axial section through a piston pump according to the invention.

DESCRIPTION OF THE EXEMPLARY EMBODIMENT

The piston pump 10 according to the invention, which is shown in the drawing, is inserted into a cylinder bore 12 in a pump housing 14, which is constituted by a hydraulic block of a vehicle brake system that is otherwise not shown. Other hydraulic components that are not shown, such as solenoid valves and the like, are inserted into the hydraulic block, of which only a fraction that encompasses the piston pump 10 is shown in the drawing for the sake of clarity, and are hydraulically connected to one another and to the piston pump 10. The hydraulic block, together with the hydraulic components inserted into it, including the piston pump 10, is part of a slip-control mechanism of a motor vehicle brake system. The hydraulic block is connected in an intrinsically known manner to a master cylinder, not shown, and wheel brake cylinders, not shown, are hydraulically connected to the hydraulic block 10.

The piston pump 10 has a sleeve 16 with a sleeve bottom 18 that is an integral part of the sleeve and is of a greater diameter and is pressed-fitted into the pump bore 12. By means of a crimp 20, a cylindrical stopper 22 is affixed to the sleeve bottom 18 and seals an end of the pump bore 12 in a pressure-tight manner by means of a caulking 24 of the pump housing 14, and fixes the sleeve 16 in the pump housing 14. As an outlet valve 28, a check valve is inserted into a blind hole 26 of the stopper 22 and has a valve ball 30 as a valve closing body, which is pressed by a helical compression spring as a valve closing spring 32 against a conical valve seat 34 which is embodied at a mouth of an axial through hole 34 in the sleeve bottom 18. An outlet takes place by means of an outlet conduit 38 that is constituted by a radial groove in the stopper 22 and communicates with an outlet bore 40 in the pump housing 14.

A piston 42 of the piston pump 10 according to the invention is an essentially cylindrical injection molded part made of plastic, which protrudes a short way out from the sleeve 16. The piston 42 is comprised of a carbon fiber reinforced plastic which has TEFLON components added to it in order to improve its sliding properties. On its end protruding from the sleeve 16, the piston 42 is axially guided directly in the pump bore 12 of the pump housing 14. A seal between the pump housing 14 and the piston 42 is produced by means of an O-ring 44, which is inserted into an annular step-shaped shoulder of the pump bore 12 and is held there by an end face of the sleeve 16. In order to guide an end the piston disposed in the sleeve 16, the piston 42 has a collar 46 that is of one piece with the piston, with which the piston 42 is axially guided in the sleeve 16. A sliding ring or the like is not required. A seal between the sleeve 16 and the piston 42 at the end of the piston 42 disposed in the sleeve 16 is produced by means of a rubber elastic elastomer sealing ring 48, which is slid onto the piston 42 from an end of the collar 46 oriented toward a displacement chamber 50 of the piston pump 10. The displacement chamber 50 is encompassed by the sleeve 16; it is defined on its end faces on the one hand by the sleeve bottom 18 and on the other hand by the piston 42 with the elastomer sealing ring 48. A volume of the displacement chamber 50 increases and decreases with an axial reciprocating stroke motion of the piston 42 in the sleeve 16, by means of which fluid is aspirated by the piston pump 10 in an intrinsically known manner and is discharged or/supplied thereto.

A cam 52 that can be driven to rotate by an electric motor is disposed against the end face of the piston 42 protruding from the sleeve 16 and the piston 42 rests with its end face 54 against the circumference surface of this cam. The end face of the piston resting against the circumference of the cam 52 constitutes a strike face 54 of the piston 42. Since during operation of the piston pump 10, a friction occurs between the circumference of the cam 52 and the strike face 54 of the piston 42 due to the rotating drive of the cam 52, the piston 42 has a cam strike piece 56 made of wear resistant material, which constitutes the strike face 54. The cam strike piece 56 is disk-shaped and in the exemplary embodiment depicted, is made of hardened steel. In the manufacturing of the piston, the cam strike piece 56 is inserted into an injection molding tool, not shown, and the plastic that constitutes the piston 42 is injection molded around the strike piece, wherein the strike face 54 remains free of plastic and the cam strike piece 56 is otherwise completely embedded in the plastic of the piston 42. On its circumference the cam strike piece 56 has a continuous groove 58 that is semicircular in cross section and produces a positive engagement between the plastic of the piston 42 and the cam strike piece 56, and thus improves a securing of the cam strike piece 56 in the piston 42.

A piston restoring spring 60 in the form of a helical compression spring, which is inserted into the displacement chamber 50, acts on the piston 42, and is supported against the sleeve bottom 18, presses the piston 42 against the cam 52, i.e. the piston restoring spring 60 holds the piston 42 so that its strike face 54 contacts the circumference of the cam 52.

For the fluid inlet, the piston pump 10 according to the invention has an inlet bore 62 that is let into the pump housing 14 radial to the pump bore 12 and feeds fluid into the pump bore 12. The inlet bore 62 in the pump housing 14 communicates with an internal chamber of the sleeve 16 by means of inlet bores 64 in the circumference of the sleeve 16. The piston 42 is provided with criss-crossing lateral holes 66 approximately in the center of its length, which cross an axial blind hole 68 close to its bottom. The blind hole 68 lets fluid out by forming a conical valve seat 70 of an inlet valve 72 of the piston pump 10 on the end face of the piston 42 oriented toward the displacement chamber 50. A flat, wide, circumferential groove 74, which is disposed in the piston 42 and has the lateral holes 66 let into its base, assures that the lateral holes 66 communicate with the inlet bores 62, 64 in every stroke position of the piston 42. With the collar 46 and the groove 74, the piston 42 has a number of steps that can be produced with no trouble by injection molding the piston 42. The lateral holes 66, which constitute a part of the fluid inlet of the piston pump 10, and the blind hole 68 in the piston 42 are formed in the piston production with forming cores inserted into the injection molding tool so that a separate work cycle is not required to make the lateral holes 66 and the blind hole 68 in the piston 42.

The inlet valve 72 is affixed to the end face of the piston 42 oriented toward the displacement chamber 50. The inlet valve 72 is embodied as a spring-loaded check valve. It has a valve ball 76 as the valve closing body which is pressed against the valve seat 70 at the mouth of the blind hole 68 of the piston 42 by a helical compression spring that constitutes a valve closing spring 78. The valve ball 76 and the valve closing spring 78 are contained in a cup-shaped valve cage 80, which is manufactured out of sheet metal as a deep-drawn part. The valve closing spring 78 is supported against a bottom of the valve cage 80. The valve cage 80 is provided with fluid openings 82 in the circumference and bottom. On an open end, an annular step 84 is formed onto the valve cage 80, with which the valve cage 80 is slid onto the end face of the piston 42 oriented toward the displacement chamber 50. A free edge of the valve cage 80 is formed into a washer-shaped spring plate 86 that protrudes radially outward. The piston restoring spring 60 engages the piston 42 by means of the spring plate 86. At the same time, the spring plate 86 secures the elastomer sealing ring 48, which is inserted between it and the collar 46 of the piston 42, axially to the piston 42. An axial spacing between the collar 46 and the spring plate 86 is greater than a width of the elastomer sealing ring 48 so that the elastomer sealing ring 48 is not axially compressed. The piston restoring spring 60 is embodied as considerably stronger than the valve closing spring 78 of the inlet valve 72 so that with all loads that occur during operation of the piston pump 10, the piston restoring spring 60 holds the piston so that the strike face 54 contacts the circumference of the cam 52 and holds the valve cage 18 against the piston 42 counter to the force of the valve closing spring 78.

Since the elastomer sealing ring 48 is slid onto the piston 42 before the valve cage 80 is attached to the piston 42, the assembly of these parts is very simple, in particular, the elastomer sealing ring 48 does not have to be deformed during assembly or only needs to be deformed to an insignificant degree.

Since the piston 42 is comprised of a soft material, namely of plastic, a piston gap between the sleeve 16 and the piston 42 or its collar 46 can be embodied as very narrow. The piston 42 can even be inserted into the sleeve 16 with a slight degree of initial stress. The piston gap of the piston pump 10 proposed here can be embodied as significantly narrower than, for example, in the case of a piston made of metal. Due to the narrow piston gap between the piston 42 and the sleeve 16, there is no danger that as a result of high pressure in the displacement chamber 50, the elastomer sealing ring 48 will be pinched into the piston gap between the piston 42 and the sleeve 16.

Should the need arise, it is also possible to eliminate the sleeve 16 and to guide the piston 42 so that the piston can axially move directly in the pump housing 14 without a sleeve (not shown). As a result, the number of required components can be reduced. This is aided by the manufacture of the piston 42 out of plastic, because even with the elimination of the sleeve 16, this assures a good, low-friction, long-lasting guidance of the piston 42 directly in the pump housing 14.

The foregoing relates to a preferred exemplary embodiment of the invention, it being understood that other variants and embodiments thereof are possible within the spirit and scope of the invention, the latter being defined by the appended claims.

In the exemplary embodiment shown, the piston 42 is embodied as being of the same diameter on both its ends. It is also possible to embody the piston as being of different diameters, i.e. to embody the piston as stepped in order, for example, to improve an aspiration behavior of the piston pump 10 (not shown). Since it is easily possible to give the piston 42 a desired, for example stepped, form with different piston diameters over the length of the piston, embodying the piston as a stepped piston does not increase the cost.

What is claimed is:

1. A piston pump for a vehicle brake system, comprising a pump housing a cylinder bore (12) in said housing, a sleeve (18) press-fitted into said cylinder bore, a piston guided in said bore so that the piston moves axially, said piston including an end face, a flat surface cam strike face on said end face, a rotatable cam element disposed to abutted said flat surface cam strike face on said end face of the piston for driving said piston in a reciprocating motion in said piston guide, the piston (42) comprises a plastic, and the cam strike face (56) is made of wear resistant material upon which the piston (42) rests as the cam element (52) drives the piston in a reciprocating motion.

2. The piston pump according to claim 1, in which the cam strike piece (56) is disk-shaped.

3. The piston pump according to claim 2, in which the cam strike piece (56) has a positive engagement element (58) engaged with said end face of the piston (42).

4. The piston pump according to claim 2, in which the cam strike piece (56) is metal.

5. The piston pump according to claim 2, in which the cam strike piece (56) is ceramic.

6. The piston pump according to claim 2, in which the piston (42) is an injection molded part, and that the end of the piston (42) is plastic which is injection molded around the cam strike piece (56).

7. The piston pump according to claim 2, in which the piston (42) is polytetrafluorethylene.

8. The piston pump according to claim 1, in which the cam strike piece (56) has a positive engagement element (58) engaged with said end face of the piston (42).

9. The piston pump according to claim 8, in which the cam strike piece (56) is metal.

10. The piston pump according to claim 8, in which the cam strike piece (56) is ceramic.

11. The piston pump according to claim 8, in which the piston (42) is an injection molded part, and that the end of the piston (42) is plastic which is injection molded around the cam strike piece (56).

12. The piston pump according to claim 8, in which the piston (42) is polytetrafluorethylene.

13. The piston pump according to claim 1, in which the cam strike piece (56) is metal.

14. The piston pump according to claim 13, in which the piston (42) is an injection molded part, and that the end of the piston (42) is plastic which is injection molded around the cam strike piece (56).

15. The piston pump according to claim 13, in which the piston (42) is polytetrafluorethylene.

16. The piston pump according to claim 1, in which the cam strike piece (56) is ceramic.

17. The piston pump according to claim 16, in which the piston (42) is polytetrafluorethylene.

18. The piston pump according to claim 1, in which the piston (42) is an injection molded part, and that the end of the piston (42) is plastic which is injection molded around the cam strike piece (56).

19. The piston pump according to claim 18, in which the piston (42) is polytetrafluorethylene.

20. The piston pump according to claim 1, in which the piston (42) is polytetrafluorethylene.

* * * * *